March 18, 1969    JAN-ERIK HENRIKSEN ET AL    3,433,882
COMPOSITE WELDING HOSE
Filed April 21, 1967
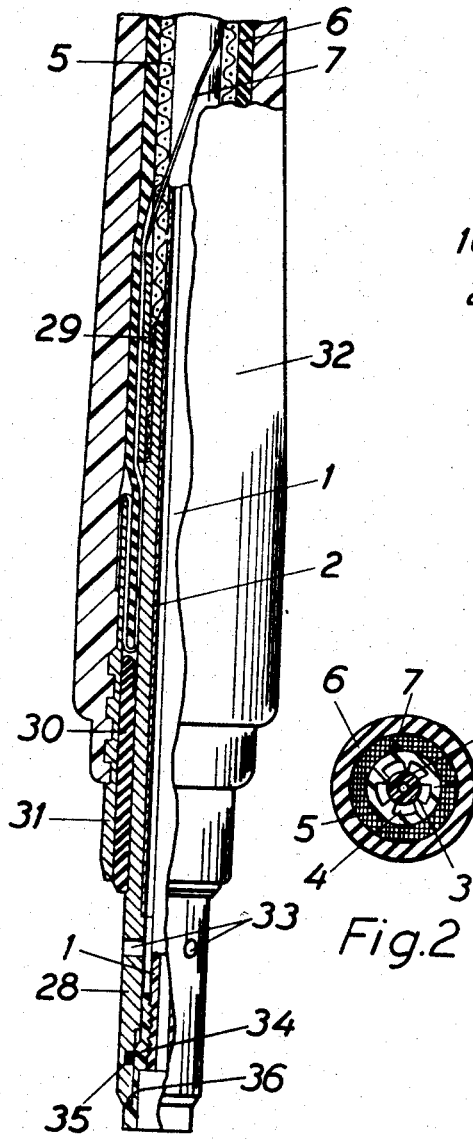
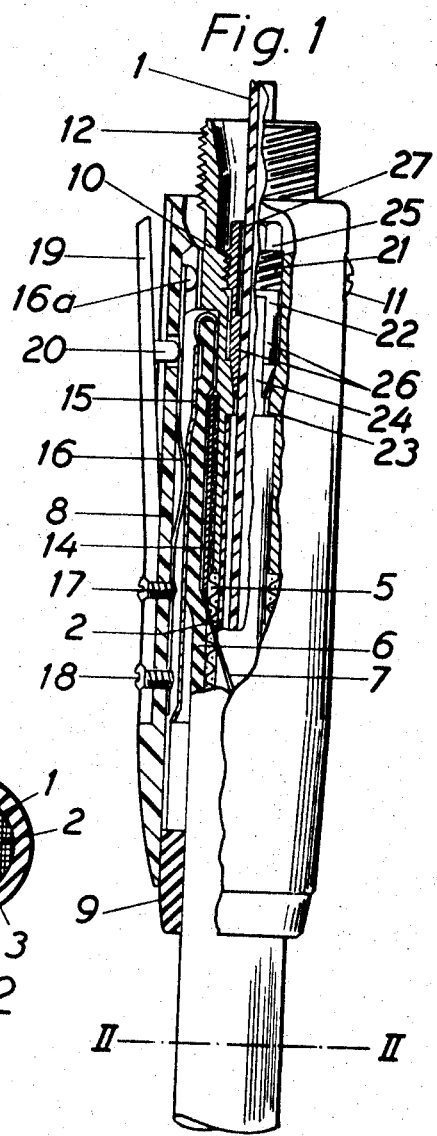

United States Patent Office 3,433,882
Patented Mar. 18, 1969

3,433,882
COMPOSITE WELDING HOSE
Jan-Erik Henriksen and Svein Bjorkum, Laxa, Sweden, assignors to Elektriska Svetsningsaktiebolaget, Goteborg, Sweden, a corporation of Sweden
Filed Apr. 21, 1967, Ser. No. 632,687
Claims priority, application Sweden, May 18, 1966, 6,871/66
U.S. Cl. 174—15        3 Claims
Int. Cl. H01b 7/34, 9/06

ABSTRACT OF THE DISCLOSURE

A composite welding hose for connecting a welding tool for gas-shielded consumable-electrode arc welding to a supply unit, comprising a flexible wire guide tube and a flexible gas conduit surrounding the wire guide tube. The interior wall of the gas conduit and/or the exterior wall of the wire guide tube is provided with longitudinal ribs supporting the wire guide tube centrally within the gas conduit. Preferably the hose also comprises a tubular welding cable closely surrounding the gas conduit.

---

The present invention relates to apparatus for gas-shielded arc welding. More particularly, the invention relates to a composite welding hose for connecting a welding tool for gas-shielded consumable-arc welding to a supply unit, said hose being of the type comprising a flexible wire guide tube and a flexible, tubular gas conduit surrounding said flexible wire guide tube.

For a satisfactory performance of a welding hose of this kind it is important that the flexible wire guide tube presents a low and substantially uniform frictional resistance to the advancement of the welding wire throughout its length, regardless of the bendings of the hose which occur in practice. It is also important that the properties of the hose are such as to ensure that changes of the frictional resistance encountered by the welding wire in the wire guide tube or in the welding gun can cause no variations in the length of the wire present between the extremities of the hose, and that there is no tendency to lateral vibration of the wire. These requirements are particularly important for welding units of the kind in which the welding wire is advanced through the welding hose by a single wire advancing mechanism adapted to push the wire into the hose.

Existing welding hoses are not entirely satisfactory in the respects indicated and therefore sometimes cause irregular fluctuations of the speed of the welding wire emerging from the welding tool.

The present invention provides a composite welding hose of the type above indicated, in which the interior wall of the tubular gas conduit and/or the exterior wall of the flexible wire guide tube is provided with longitudinal ribs serving to support the wire guide tube centrally within the gas conduit tube. This feature has proved to result in substantially improved properties in the respects referred to.

The composite welding hose according to the invention preferably also comprises a tubular welding current cable closely surrounding the outer flexible tube, and an insulating sheath on said welding current cable.

In one practical form of the invention, the composite hose is fitted at each of its ends with a connector member adapted to connect the composite hose to the welding tool and to the supply unit respectively. The invention also comprises design features allowing easy and quick disengagement, removal and replacement of the wire guide tube of a welding hose unit equipped with such connector members.

The invention shall now be described in more detail with reference to the accompanying drawings illustrating an embodiment of the invention in which FIG. 1 is a side view, partly in section, of one end of a composite hose according to the invention and a connector member fitted thereon, FIG. 2 is a sectional view taken along the line II—II in FIG. 1, FIG. 3 is a side view of the opposite end of the composite hose with its connector member.

The composite hose unit shown comprises, as best seen from FIG. 2, an inner flexible tube 1, an outer flexible tube 2, a tubular welding current cable 5, and an insulating sheath 6. The inner tube 1 preferably consists of a wear resistant low-friction plastic such as polytetrafluoroethylene with or without glass fibre reinforcement. The inner diameter of the inner tube 1 should only slightly exceed the diameter of the welding wire (not shown) to be advanced through the tube, in order to provide a good guiding action. The outer tube 2 is provided with five longitudinal ribs 3 directed radially inwards and serving to support the inner tube 1 at the centre of the outer tube. Said outer tube consists of a flexible synthetic material, for instance a polyamide plastic. The channels 4 between the ribs 3 serve to conduct the shielding gas, for instance carbon dioxide, to the welding tool. The welding cable 5 which closely surrounds the outer tube 2 consists of a large number of fine copper wires which form a tubular bundle and which may or may not be plaited or otherwise combined into a coherent structure. The outer sheath 6, which for instance consists of reinforced rubber, provides the electrical insulation and the mechanical protection of the hose unit. An insulated conductor 7 which forms part of a control circuit is spirally wound about the outer tube 2.

The connector member shown in FIG. 1 comprises a sleeve 10 the interior extremity of which is provided with threads 12 adapted to receive the internally threaded rear end of a welding tool or welding gun barrel of conventional design (not shown). The outer tube 2 of the hose unit is fitted into the rear end of said sleeve and abuts against an annular shoulder 23 in the sleeve, while the inner tube 1 extends all the way through the sleeve 10 and has a portion extending into the welding tool, or gun barrel. To secure the tube 1 to the sleeve 10, there is provided a clamping sleeve 22 having a threaded portion 21 engaging internal threads in the sleeve 10 and a rear portion divided by axial slits 24 into two (or more) elastic clamping jaws or prongs 26 engaging a conical portion of the bore of the sleeve 10. The clamping sleeve 22 is rotated with the aid of a suitable socket wrench engaging the hexagonal head 25 of the sleeve 22. Clockwise rotation of the sleeve 22 causes the prongs 26 to be forced into engagement with the inner tube 1 under the action of the conical wall of the sleeve 10.

The welding current cable 5 is secured to the exterior wall of the sleeve 10 by a clamp 14. An electrically insulating handle sleeve 8 the rear end of which engages a rubber cuff 9 on the cable sheath 6 is secured to the sleeve 10 by a screw 11. A control lever 19 is attached to the handle sleeve by means of screws 17, 18 and operates through the stud 20 a spring 16 provided with a contact member 16a. A curved portion of the spring 16 engages a sleeve 15 gripping the cable sheath 6 and electrically connected to the conductor 7.

The current of shielding gas emerging from the channels 4 at the upper end of the tube 2 enters the annular space between the bore 27 of the sleeve 22 and the inner tube 1 through the slots 24 and is discharged into the welding tool through the annular space between the inner tube 1 and the threaded extremity of the sleeve 10.

The connector member of FIG. 3 serves to connect the hose unit to a supply unit (not shown) for the supply of welding current, welding wire and shielding gas to the welding tool. The connector member comprises a metal sleeve 28 the free extremity of which serves as a contact plug for insertion into a corresponding contact sleeve of the supply unit. The welding current cable 5 is attached by a clamp 29 to the other extremity of the sleeve 28. The cable sheath 6 is extended beyond the end of the cable so as to engage part of the outer wall of the sleeve. A contact sleeve 31 electrically connected to the conductor 7 firmly engages said extension of the cable sheath as well as a separate insulating sleeve 30 bonded to the metal sleeve 28. An outer, thick-walled rubber sleeve 32 serves as a grip and provides additional insulation. The outer tube 2 of the composite hose engages the inner wall of sleeve 28. The extremity of the inner tube 1 is provided with external threads engaging internal threads on a bushing 34 fitted into the plug portion of the sleeve 28 and provided with an annular shoulder 36 engaging the annular end face of said plug portion, whereby said end face serves as a stop with regard to motion of the bushing 34 and the inner tube 1 towards the welding tool. Said bushing preferably consists of a plastic, for instance of the polytetrafluoroethylene type. The plug portion of the sleeve 28 is provided with radial ports 33 through which the shielding gas supplied by the supply unit is discharged into the annular space between the inner hose 1 and the sleeve 28. A sealing ring 35 prevents leakage of shielding gas between the bushing 34 and the sleeve 28.

It has already been said above that the inner diameter of the wire guide tube 1 should only slightly exceed the wire diameter. If the hose unit shown is to be used with wires of different sizes, it is advisable to provide a set of wire guide tubes 1 the internal diameters of which are chosen according to the wire sizes to be employed, while the external diameter is the same for all of the tubes of the set. Removal of an inner tube from the hose unit is effected simply by loosening the clamping sleeve 22 by rotating its hexagonal head counterclockwise and extracting the tube by pulling at the bushing 34.

The wire guide tube 1 may, if desired, be provided with a lining consisting of a tightly wound cylindrical spiral of wear-resistant wire. It is also possible and within the invention to employ a wire guide tube consisting entirely of such a spiral.

We claim:

1. A composite welding hose for connecting a welding tool for gas-shielded consumable-electrode arc welding to a supply unit, comprising a flexible wire guide tube and a flexible, tubular gas conduit surrounding said flexible wire guide tube, at least one of said two tubular members being provided with longitudinal ribs adapted to support the wire guide centrally within the gas conduit and a tubular welding current cable closely surrounding the gas conduit, and an insulating sheath on said welding current cable.

2. A composite welding hose for connecting a welding tool for gas-shielded consumable-electrode arc welding to a supply unit, comprising a flexible wire guide tube and a flexible, tubular gas conduit surrounding said flexible wire guide tube, at least one of said two tubular members being provided with longitudinal ribs adapted to support the wire guide centrally within the gas conduit having fitted to each of the ends of the gas conduit a connector member adapted to connect the hose to the welding tool and to the supply unit, respectively, in which one of said connector members is provided wtih clamping means for the flexible wire guide comprising a first sleeve, the inner wall of which has a threaded portion and a conically tapering portion, and a second sleeve having a threaded portion engaging the threaded portion of the first sleeve, said second sleeve being provided with elastic prongs engaging said conically tapering portion and adapted on displacement towards the apex of the conically tapering portion to grip the flexible wire guide.

3. A composite welding hose as claimed in claim 2 in which the extremity of the flexible wire guide associated with the other connector member is fitted with a single, sleeve-shaped retaining member abutting an annular surface on the connector member, said surface facing away from the opposite end of the cable, said retaining member being otherwise axially unrestricted, whereby disengagement of the clamping means provided in the first connector member permits the flexible wire guide to be pulled out through the other connector member.

References Cited

UNITED STATES PATENTS

| 2,544,711 | 3/1951 | Mikhalapov | 219—74 |
| 3,048,691 | 8/1962 | Longstreth | 219—130 |

FOREIGN PATENTS

| 774,204 | 5/1967 | Great Britain. |

LEWIS H. MYERS, *Primary Examiner.*

A. T. GRIMLEY, *Assistant Examiner.*

U.S. Cl. X.R.

339—016; 219—136